(12) United States Patent
Sengupta et al.

(10) Patent No.: US 6,848,087 B2
(45) Date of Patent: Jan. 25, 2005

(54) SUB-RESOLUTION ALIGNMENT OF IMAGES

(75) Inventors: Madhumita Sengupta, Sunnyvale, CA (US); Mamta Sinha, Palo Alto, CA (US); Theodore R. Lundquist, Dublin, CA (US); William Thompson, Los Altos, CA (US)

(73) Assignee: Credence Systems Corporation, Milpitas, CA (US)

( * ) Notice: Subject to any disclaimer, the term of this patent is extended or adjusted under 35 U.S.C. 154(b) by 193 days.

(21) Appl. No.: 10/159,527

(22) Filed: May 30, 2002

(65) Prior Publication Data

US 2002/0199164 A1 Dec. 26, 2002

Related U.S. Application Data

(60) Provisional application No. 60/294,716, filed on May 30, 2001.

(51) Int. Cl.[7] ............................................. G06F 17/50
(52) U.S. Cl. .............................. 716/4; 716/19; 716/20; 716/21
(58) Field of Search ............................... 716/4, 19, 20, 716/21

(56) References Cited

U.S. PATENT DOCUMENTS

| | | | | |
|---|---|---|---|---|
| 4,730,158 A | * | 3/1988 | Kasai et al. ................. | 324/751 |
| 4,805,123 A | * | 2/1989 | Specht et al. ............... | 382/144 |
| 5,548,326 A | | 8/1996 | Michael | |
| 5,550,937 A | | 8/1996 | Bell et al. | |
| 5,755,501 A | * | 5/1998 | Shinohara et al. ............ | 353/31 |
| 5,995,681 A | | 11/1999 | Lee et al. | |
| 6,256,767 B1 | * | 7/2001 | Kuekes et al. ................. | 716/9 |
| 6,282,309 B1 | * | 8/2001 | Emery ........................ | 382/145 |
| 6,343,143 B1 | | 1/2002 | Guillemaud et al. | |

FOREIGN PATENT DOCUMENTS

EP   09 49588   10/1999

OTHER PUBLICATIONS

M. Sengupta, et al., "Sub–resolution placement using IR image to CAD database alignment: an algorithm for silicon––side probing", *Proceedings of SPIE*, vol. 4667 pp. 449–459, Jan. 2002.

N.T. Sullivan, "Critical Issues in Overlay Metrology", *Characterization and Metrology for ULSI Technology*, 2000 International Conference, AIP Conference Proceedings, vol. 550, pp. 346–350, 2000.

N. Sullivan, et al., "Overlay Metrology: The systematic, the random and the ugly", *Characterization and Metrology for ULSI Technology*, 1998 International Conference, AIP Conference Proceedings, vol. 449, pp. 502–512, 1998.

(List continued on next page.)

*Primary Examiner*—Vuthe Siek
*Assistant Examiner*—Brandon Bowers
(74) *Attorney, Agent, or Firm*—Fish & Richardson P.C.

(57) ABSTRACT

A plurality of images, including a first image and a second image having a higher resolution than the first image, are aligned by generating an oversampled cross correlation image that corresponds to relative displacements of the first and second images, and, based on the oversampled cross correlation image, determining an offset value that corresponds to a misalignment of the first and second images. The first and second images are aligned to a precision greater than the resolution of the first image, based on the determined offset value. Enhanced results are achieved by performing another iteration of generating an oversampled cross correlation image and determining an offset value for the first and second images. Generating the oversampled cross correlation image may involve generating a cross correlation image that corresponds to relative displacements of the first and second images, and oversampling the cross correlation image to generate the oversampled cross correlation image.

63 Claims, 5 Drawing Sheets

OTHER PUBLICATIONS

K. Watson, "Processing remote sensing images using the 2–D FFT Noise reduction and other applications", *Geophysics*, vol. 58, No. 6, pp. 835–848, 1993.

"Fast Signal Sinc–Interpolation Methods for Signal and Image Resampling", Proceedings of SPIE, vol. 4667 (Jan., 2002), pp. 120–129.

"Subpixel Localization of Synthetic References in Digital Images by use of Noncomposite and Composite Augmented Templates", Proceedings of SPIE, vol. 4667 (Jan., 2000), pp. 139–148.

* cited by examiner

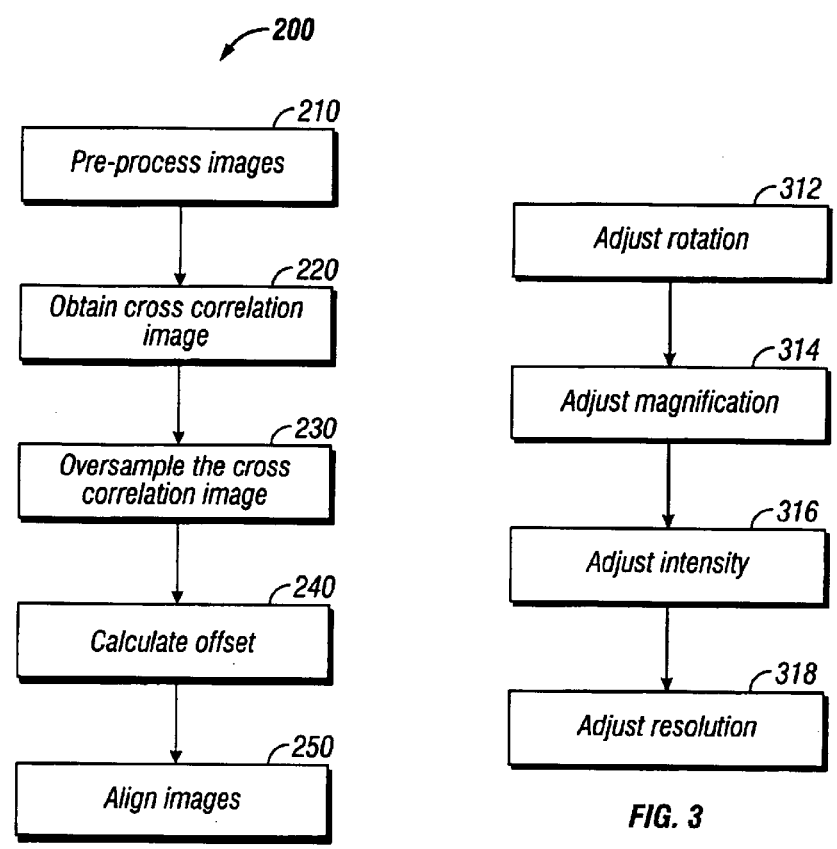

SUB-RESOLUTION ALIGNMENT OF IMAGES

RELATED APPLICATION

This application claims priority to U.S. Provisional Patent Application No. 60/294,716, filed May 30, 2001.

BACKGROUND

The present application relates to sub-resolution alignment of images, for example, such as used in probing and editing integrated circuits.

An integrated circuit ("IC") integrates a large number of electronic circuit elements on a single semiconductor substrate with high density: today's technology allows a minimum feature size on the order of 0.1 micron. During designing, prototyping, and testing an IC, circuit elements can be probed and edited. To probe or edit an IC using, for example, laser voltage probing ("LVP") or focused ion beam ("FIB"), a circuit element first is located on the substrate of an IC under test. Typically, this step includes aligning corresponding features of two different images of the IC under test. The first image can be an acquired image that describes the actual position of the circuit. The second image can be derived from a computer-aided design ("CAD") image that lays out the complicated map of circuit elements. In general, a CAD image is ideal representation of the IC and typically is generated by a human operator using a CAD system. Once the acquired image is aligned, or registered, with the CAD image, a conventional system can navigate, that is, steer, an IC probing device to a circuit element to be probed.

To acquire an image for alignment, an IC can be imaged, for example, by infrared ("IR") light. Typically used for an IC with a flip-chip design, IR light can image the IC from the silicon side, i.e., through the substrate. To see through the substrate, which can be several hundred microns thick, silicon side imaging may use IR light with a wavelength of about one micron. Using an IR wavelength of about one micron, however, results in an acquired image of roughly the same resolution as the wavelength of the IR light used for imaging. That is, the resulting IR image has a resolution of about one micron. Such an IR image typically cannot adequately be used to resolve sub-resolution features, i.e., circuit elements that are smaller than the IR wavelength.

To locate sub-resolution features for IC probing or editing, an attempt can be made to align an IR image with the corresponding CAD image with sub-resolution accuracy. For example, a human operator can try to align an IR image with a CAD image visually. This method, however, typically gives an optimal accuracy of about one micron, which is essentially the same as the resolution of the IR image, and typically insufficient for LVP or FIB editing. For aligning IR and CAD images with sufficient accuracy, one can try standard alignment techniques, such as intensity correlation, edge detection or binary correlation algorithms. These techniques tend to give limited accuracy as well, because IR images may be distorted by light diffraction and other optical effects. Alignment of an IR and a CAD image may be further complicated by substantial intensity variations. Intensity on the IR image can depend on several parameters, including thickness and reflectivity of different layers. Furthermore, IR images may have optical ghosts that may cause an alignment method to produce incorrect results.

SUMMARY

The present inventors discovered techniques for aligning images with sub-resolution precision. An implementation of such techniques aligns features in a high-resolution CAD image of an IC design with corresponding features in a lower-resolution acquired (e.g., IR) image of the actual IC. Implementations of systems and techniques for achieving sub-resolution alignment of images may include various combinations of the following features.

In general, in one aspect, a plurality of images, including a first image and a second image having a higher resolution than the first image, may be aligned by generating an oversampled cross correlation image. The oversampled cross correlation image corresponds to relative displacements of the first and second images. Based on the oversampled cross correlation image, an offset value can be determined. The offset value corresponds to a misalignment of the first and second images.

In general, in another aspect, images, including a first image and a second image having a higher resolution than the first image, may be aligned by achieving a sub-resolution alignment of the first and second images. The sub-resolution alignment may be achieved by performing a cross correlation of the images and a frequency domain interpolation of the images.

In general, in another, aspect, integrated circuit devices may be inspected by obtaining a computer-generated representation of a physical layout of an integrated circuit design, and acquiring an image of an integrated circuit device corresponding to the integrated circuit design. The acquired image may have a resolution that is lower than a resolution of the computer-generated representation. An oversampled cross correlation image can be generated. The oversampled cross correlation image corresponds to displacements of the computer-generated representation and the acquired image. Based on the oversampled cross correlation image, an offset value can be determined. The determined offset value corresponds to a misalignment of the computer-generated representation and the acquired image. With a precision exceeding the resolution of the acquired image, the computer-generated representation and the acquired image can be aligned based on the determined offset value. The integrated circuit device can be probed based on a result of the alignment.

In general, in another aspect, alignment of a plurality of images, including a first image and a second image having a higher resolution than the first image, can be facilitated by pre-processing the second image to optimize one or more properties of the second image, and generating an oversampled cross correlation image. The oversampled cross correlation image corresponds to displacements of the first and second images. Based on the oversampled cross correlation image, an offset value can be determined. The determined offset value corresponds to a misalignment of the first and second images.

Advantageous implementations may include one or more of the following features. Based on the determined offset value, the first and second images can be aligned. Alignment of the first and second images can be achieved to a precision greater than the resolution of the first image. After aligning the first and second images, another iteration of generating an oversampled cross correlation image and determining an offset value for the first and second images can be performed.

Generating the oversampled cross correlation image can include generating a cross correlation image. The cross correlation image corresponds to relative displacements of the first and second images. The cross correlation image can be oversampled to generate the oversampled cross correlation image. Oversampling the cross correlation image can include generating sub-pixel points for the oversampled cross correlation image. In the oversampled cross correlation image, frequencies missing from the cross correlation image can be excluded. Excluding frequencies can include using a zero padding technique to set high frequency components to zero. Generating sub-pixel points can use a spatial domain technique. At least one of the first and second images can be oversampled; then, the first and second images can be cross-correlated to generate the oversampled cross correlation image.

The first and second images can represent a common object. The common object can include a physical layout of an integrated circuit. Based on the determined offset value, an apparatus can be navigated to a specified point on the integrated circuit with a precision greater than the resolution of the first image. The integrated circuit can be probed at the specified point. The integrated circuit can be probed with laser voltage probing. The integrated circuit can be edited at the specified point. The integrated circuit can be edited with focused ion beam. The common object can represent a voltage contrast of an integrated circuit.

At least one of the first and second images can include an acquired image. The acquired image can be an acquired image of an integrated circuit. The acquired image can be acquired from the silicon side or the front side of the integrated circuit. The acquired image can be an optically acquired image. The optically acquired image can be an infrared image. The acquired image can be a voltage contrast image, a scanning electron microscope image, a FIB image, or can be acquired by an electron beam prober. The second image can include an ideal reference image. The ideal reference image can be an image of an integrated circuit generated by a computer-aided design system.

Generating the oversampled cross correlation image can include calculating correlation values that characterize relative displacements and corresponding overlaps of the first and second images. The correlation values can be calculated using Fast Fourier Transform techniques. Determining the offset value can include determining a location of a maximum correlation value between the first and second images. The maximum correlation value can be used as a confidence factor characterizing confidence in the offset value.

Prior to generating the oversampled cross correlation image, one or each of the first and second images can be pre-processed to reduce mismatch between the first and the second image. Pre-processing can include one or more of adjusting rotation, adjusting magnification, adjusting intensity, and filtering. Adjusting rotation can include calculating angular mismatch between the first and the second image. Magnification can be adjusted using a 3-point alignment technique. Adjusting intensity can include normalizing intensities of the first and second images by a histogram equalization technique. Intensity can be adjusted by matching gray-scale levels in corresponding regions of the first and second images. Filtering can include applying a low pass filter to the second image. Filtering can include filtering with a point spread function. The point spread function can simulate optical ghosting in one of the first and second images.

A second oversampled cross correlation image can be generated. The second oversampled cross correlation image corresponds to relative displacements of the second image and a third image. The third image can be aligned with the first and second images based on the second oversampled cross correlation image.

In general, in another aspect, an image alignment system can include an image acquisition system, a pre-processor, a cross correlator, an interpolator, and an alignment component. The image acquisition system can be capable of acquiring a first image of an object. The pre-processor can be configured to optimize properties of a second image of the object. The second image may have a greater resolution than the first image. The cross correlator can be configured to generate a cross correlation image corresponding to displacements of the first image and the pre-processed second image. The interpolator can be configured to determine, based on the cross correlation image, an offset value corresponding to a misalignment of the first and second images. The alignment component can be configured to align the first and second images based on the determined offset value.

Advantageous implementations can include one or more of the following features. The object can be an integrated circuit. The image acquisition system can include an infrared imaging device and/or a focused ion beam device. The pre-processor can be configured to perform one or more of the following operations: rotation adjustment, magnification adjustment, intensity adjustment and filtering. The pre-processor can be configured to perform filtering based on a point spread function. One or more of the following can be implemented in software: the pre-processor, the cross-correlator, the interpolator and the alignment component. The alignment component can include elements to digitally align the first and second images. The interpolator can include an oversampler configured to oversample the cross correlation image.

The systems and techniques described here may be implemented in a method or as an apparatus, including a computer program product, and provide one or more of the following advantages. A lower-resolution image can be aligned with a higher-resolution image so that the alignment has an accuracy that exceeds the lower resolution. The lower-resolution image can be a FIB image, an electron beam image, or an optical, e.g., IR image; the higher-resolution image can be a computer generated, e.g., a CAD image, or an acquired image, e.g., a FIB image. An IR image can be used to locate a circuit element of an IC, even if the circuit element is smaller than the resolution of the IR image. The images can be aligned with sub-resolution precision, if one or both images are distorted by optical effects, e.g., by optical ghosts. Alignment of the images can be automated even when the images have different resolutions or distortions.

The details of one or more embodiments are set forth in the accompanying drawings and the description below. Other features and advantages will be apparent from the description and drawings, and from the claims.

DRAWING DESCRIPTIONS

FIG. 2 is a flowchart that shows a method for aligning two images in accordance with an implementation of the application.

FIG. 3 is a flowchart showing a method for pre-processing images in an implementation of the application.

Like reference symbols in the various drawings indicate like elements.

DETAILED DESCRIPTION

Figure 1:
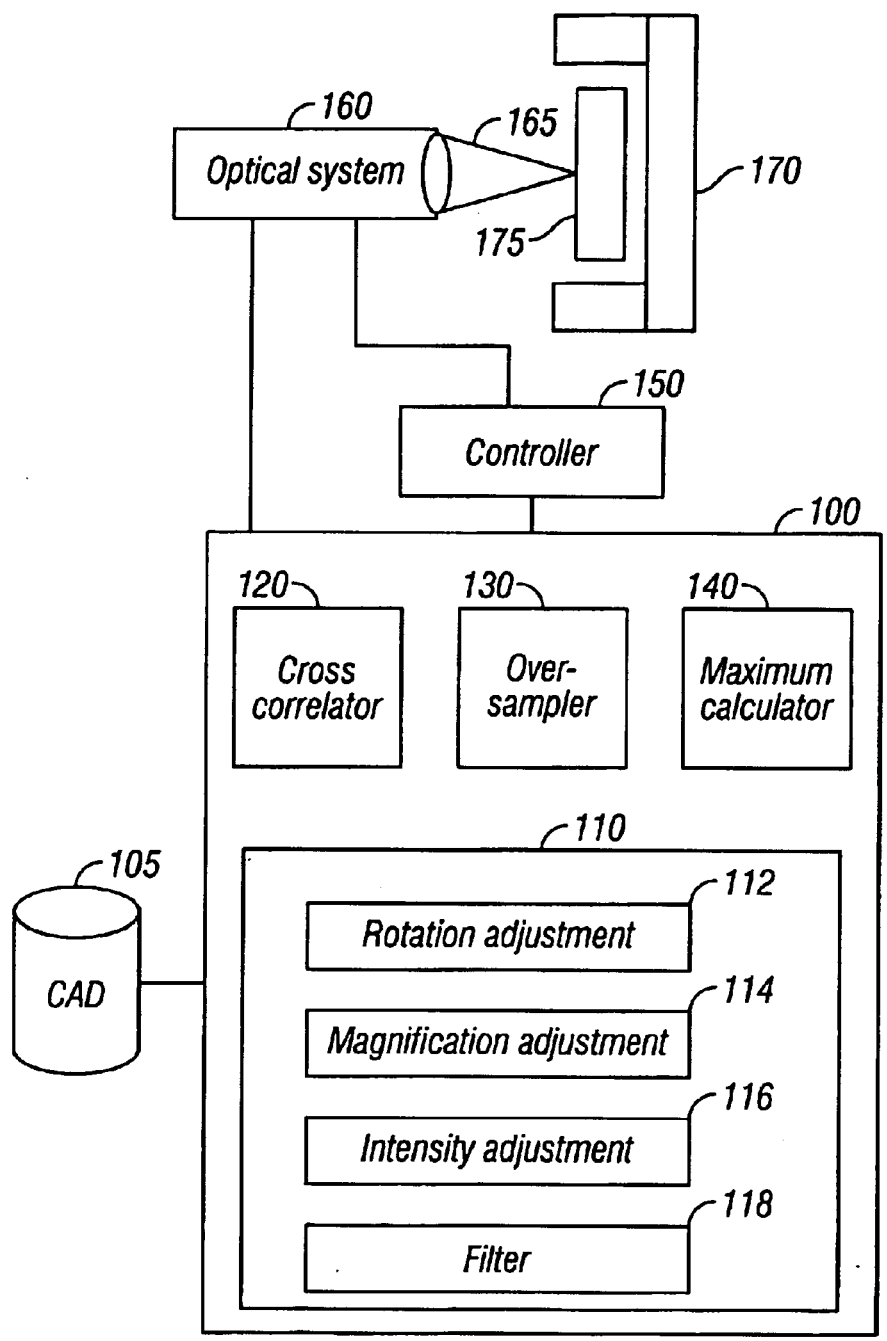
FIG. 1 shows a block diagram of a system capable of aligning an optical image with a CAD image with sub-resolution accuracy.

FIG. 1 shows a block diagram of an alignment system 100 for aligning, with sub-resolution accuracy, an optical image and a CAD image. More generally, the alignment system 100 aligns features in a higher-resolution reference image, e.g., a CAD image of an integrated circuit 175, with corresponding features in a lower-resolution acquired image, e.g., an optical image of the IC 175. The IC 175 can be held by a sample holder 170, and imaged using IR light 165 by an optical system 160, such as the Schlumberger IDS OptFIB integrated diagnostic system. The IC 175 can have a flip-chip design. The optical system 160 can image the IC 175 from the silicon side, i.e., through the substrate. Alternatively, the IC 175 can be imaged from the front side where circuit elements are exposed.

As shown in FIG. 1, in one implementation, the alignment system 100 receives the optical image from the optical system 160, and the CAD image from a CAD storage device 105. Furthermore, after aligning the optical and CAD images, the alignment system 100 can provide information to a controller 150 to locate a circuit element of the IC 175. The controller 150 may manipulate the sample holder 170 to move the IC 175 into a desired position, or the optical system to image the IC 175 in a desired way. The controller 150 can be implemented in a microprocessor-controlled device. The alignment system 100 can be implemented, e.g., as computer software running on a computer. As explained with reference to FIG. 2, the alignment system 100 uses a pre-processor 110, a cross correlator 120, an oversampler 130, and a maximum calculator 140 to align acquired images with reference images.

Figures 4A, 4B, 4C:
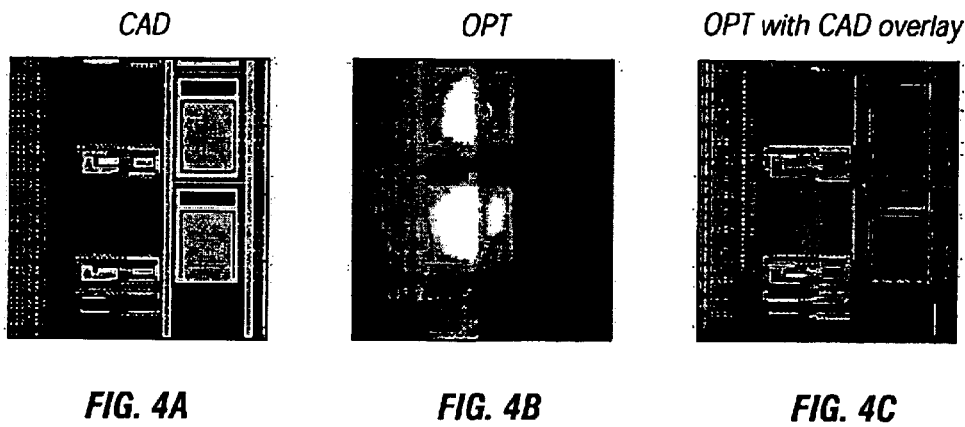
FIG. 4A shows an example CAD image.
FIG. 4B shows an example optical image corresponding to the CAD image in FIG. 4A.
FIG. 4C shows an alignment of the images in FIGS. 4A and 4B.

As shown in FIG. 2, in one implementation, a method 200 can align two different images of the same object including, e.g., a reference image and an acquired image. In general, the reference image has a higher resolution than the acquired image. The reference image can be a theoretical, or ideal, image, such as a CAD image of an IC, such as shown in FIG. 4A. The acquired image can be a lower-resolution measured image such as a FIB image, an image measured by an electron-beam prober, a voltage contrast image, or an optical image, such as an IR or a visible light image of the IC. Alternatively, the reference image can be an acquired image with higher resolution, such as a high resolution FIB, voltage contrast, or scanning electron microscope image. One or both of the two images may be distorted by optical effects or other noise that deteriorates image quality. Furthermore, the method 200 can align images having optical ghosts.

As implemented, the method 200 first pre-processes the images to decrease the differences between the two images (210). In the implementation shown in FIG. 1, the pre-processor 110 pre-processes the optical image or the CAD image by rotation adjustment 112, magnification adjustment 114, intensity adjustment 116, and/or filtering 118. Methods for using the components 112–118 are discussed with reference to FIGS. 3–6C.

Figure 7A:
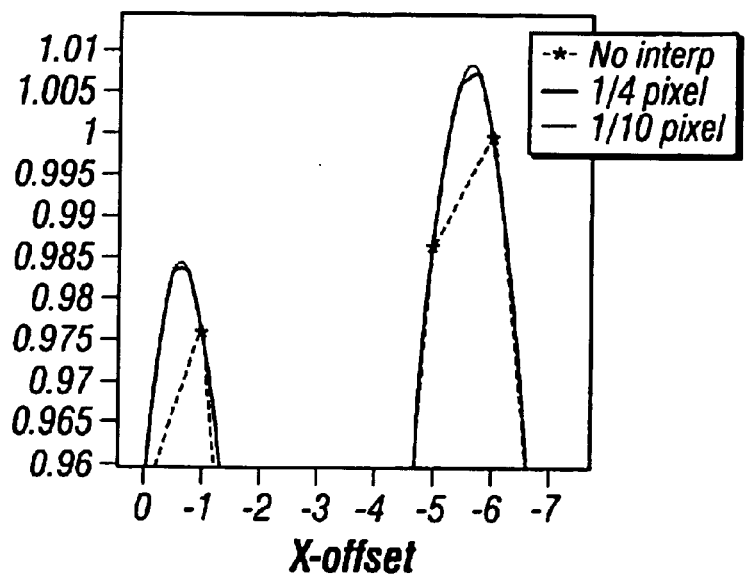
FIG. 7A shows a graph of an offset value calculation with an unfiltered CAD image.
Figure 7B:
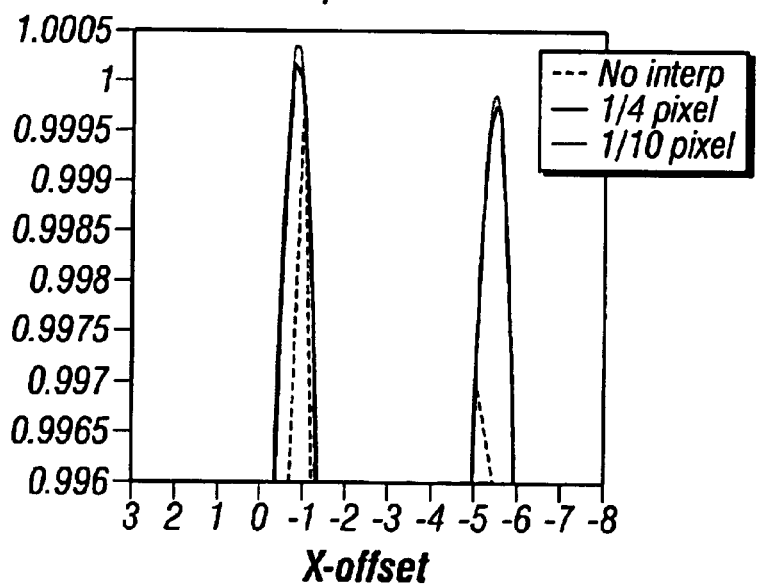
FIG. 7B shows a graph of an offset value calculation with a filtered CAD image.

Next, a cross correlation image is generated from the two images (220). For example, the cross correlator 120 can produce a cross correlation image from the pre-processed optical and CAD images. Examples of determining the cross correlation of images are shown in FIGS. 7A–7B.

Next, the cross correlation image is oversampled, i.e., interpolated, to obtain sub-resolution accuracy (230). The cross correlation image is oversampled by the oversampler 130. From the oversampled cross correlation image, an offset value is calculated to characterize the misalignment of the two images (240). The maximum calculator 140 calculates an offset value that maximizes the correlation between the optical and CAD images of the IC 175. In an alternative implementation, an interpolator can calculate an offset value directly from the cross correlation image. Finally, based on the offset value, the two images are aligned (step 250); for example, the two images can be aligned digitally by the alignment system 100. Once the optical and CAD images are aligned, or equivalently, registered, the controller 150 can navigate the optical system 160, the sample holder 170, or any other, e.g., LVP or electron-beam, probing device to a particular circuit element of the IC 175.

FIG. 3 is a flowchart showing details of pre-processing images (210). To decrease mismatch of two images for alignment, pre-processing can include adjustments of rotation (312), magnification (314), intensity (316), and resolution (318). As discussed below in detail, these adjustments can be performed, e.g., by the pre-processing device 110, or, alternatively, by a human operator. If one of the two images is an optical image of the integrated circuit 175, the controller 150 can instruct the optical system 160 or the sample holder 170 to perform operations as part of the pre-processing adjustments of the optical image.

In one implementation, pre-processing starts with a rotation adjustment to adjust the relative orientation of the two images in order to correct orientation mismatches (312). Rotation adjustment can include computing an angle θ to characterize the difference between angular orientations of the two images. The angle computation can be performed, e.g., by the rotation adjustment component 112. In one implementation, rotation adjustment 112 is performed by computing the angle θ using Radon transforms as described by R. Bracewell, "The Fourier Transform and its Applications", McGraw-Hill (1986), ("Bracewell"). For aligning an optical image and a CAD image of an IC 175, rotation adjustment 112 involves sending the value of the angle θ to the controller 150. Then, the controller can rotate the sample holder 170 holding the IC 175 by the angle θ. Optionally, a human operator can rotate the sample holder 170. Alternatively, the rotation adjusting device 112 can digitally rotate the optical image, or the CAD image, or both.

Pre-processing can include adjusting magnifications to equalize two images for alignment (314). If they have different magnifications, the two images can be aligned only locally: when a small sub-region of the images is aligned, other sub-regions can remain misaligned. Consequently, aligning different sub-regions can give different offset values. For example, as shown for an inverter section of an IC in FIGS. 4A–C, a CAD image (FIG. 4A) cannot be properly aligned globally with a corresponding optical (IR) image (FIG. 4B) due to a magnification mismatch (as shown in FIG. 4C). Due to the magnification mismatch between FIGS. 4A and 4B, computed offsets may vary by as much as 12 pixels when attempting to align different sub-regions.

In the implementation shown in FIG. 1, magnification adjustment 114 matches magnification between two images, such as an optical image and a CAD image. For matching magnification, the magnification adjustment component 114 can use a 3-point alignment and layout overlay techniques. A 3-point alignment technique includes locking an optical image to a CAD image at three positions and then adjusting the magnification of one or both of the two images. An overlay technique includes overlaying an optical image over a CAD image and then similarly adjusting the magnification of one or both of the images. Magnification adjustment can be done, for example, digitally by the magnification adjustment component 114, or manually by a human operator. Alternatively, the controller 150 can instruct the optical system 160 to change the magnification of the optical image. Optionally, the magnification adjustment component 114 can automatically match magnification when the CAD magnification is known with sufficient accuracy.

Next, pre-processing can include intensity adjustments to equalize intensities of the two images for alignment (316). For example, an optical image and a CAD image may have inconsistent intensities for corresponding regions (see, e.g., FIGS. 4A and 4B). Equalizing these intensities tends to improve alignment quality. In an optical (IR) image of a flip-chip IC, intensities may vary due to the substrate thickness. For example, a thick silicon substrate absorbs much of the reflected light and this absorption leads to low intensity. Furthermore, different layers of an IC may have different reflectivity causing different intensities in the optical image.

To match intensity variations, in one implementation, intensity adjustment 116 involves assigning gray levels to layers displayed in a CAD image of an IC. The assigned gray levels can be matched with intensities in a corresponding optical image. For example, in an IR optical image of an IC, diffusion regions appear as dark, and metal regions appear as bright areas. Accordingly, in the corresponding CAD image, the intensity adjusting device 116 can assign a black color to features representing diffusion regions, and a white color to features representing bright metal areas. Alternatively, a human operator can assist in assigning gray levels to features on the CAD image. Optionally, the intensity adjusting device 116 can change the intensity of the optical image by manipulation of the optical system 160 through the controller 150. Finally, the intensity adjusting device 116 can normalize intensities of the two images, for example, by using known histogram equalization techniques, such as disclosed in J. Russ, "Image Processing Handbook", IEEE Press (1999).

Figure 5:
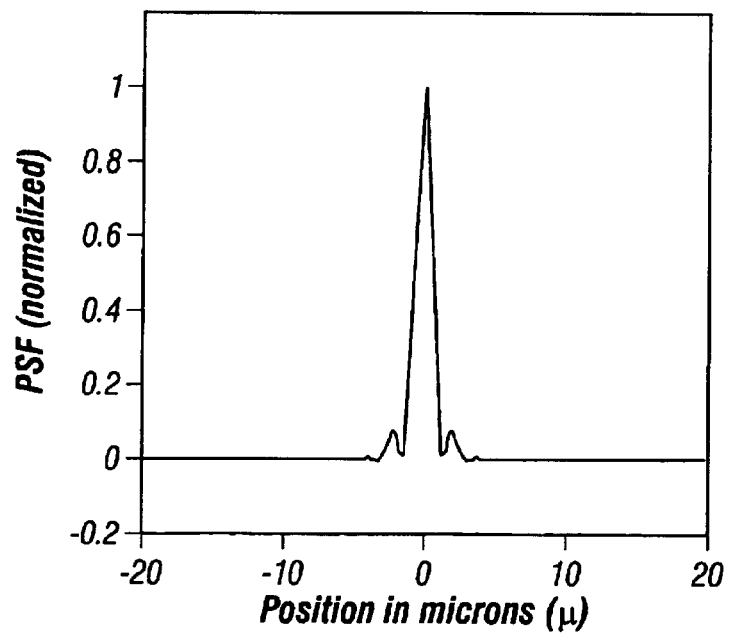
FIG. 5 is a graph of a point spread function.

Next, pre-processing may include adjusting resolution to equalize two images for alignment (318). In one implementation, the filter 118 can adjust resolution by applying a filtering technique to one of the two images; optionally, both images can be filtered. The filter 118 can use various different filtering techniques, such as a general high or low pass frequency filter or a point spread function ("PSF"). The PSF is also known as an impulse response function or a transfer function. If one of the two images is an optical image, the PSF may be characteristic to an optical system that acquired the optical image. As shown in FIG. 5, a point spread function can characterize an IR optical microscope used for imaging integrated circuits. Typically, such as in the function shown in FIG. 5, a point spread function spreads in a cylindrically symmetric way around a center point, where the PSF assumes a maximum value. But, depending on aberrations in the optical system, a PSF can be asymmetric as well. As shown in FIG. 5, a point spread function may have diffraction maximums, or lobes, circling the center point. A point spread function can be obtained from a diffraction image of a point source. The diffraction image can be calculated from theoretical models, or measured in an experiment.

In one implementation, the filter component 118 can lower the resolution of a higher resolution image to match the resolution of a lower resolution image. To lower the resolution of the higher resolution image, the filter component 118 can filter the higher resolution image with a general low-pass frequency filter or a point spread function. To perform filtering with the PSF, the filter component 118 can convolute the point spread function with the higher resolution image. Convolution can be implemented, for example, by direct integration or using Fourier transforms, as described in detail, e.g., in "Bracewell". In particular, the filter 118 can use fast Fourier transformation ("FFT") to implement the convolution. As a result of the convolution, the higher resolution image is turned into a convoluted image. The convoluted image can have a resolution that matches the resolution of the lower resolution image. Advantageously, when the resolution match is reached by lowering the resolution of the higher resolution image, noise is not enhanced, and the result is independent of image quality of the lower resolution, typically acquired, image. Furthermore, by lowering the resolution of the higher resolution image before offset calculation, convolution generates a convoluted image that satisfies the Nyquist condition for sub-resolution offset computation.

In an alternative implementation, the filter 118 can sharpen a lower resolution image to match the resolution of a higher resolution image. To sharpen the lower resolution image, the filter 118 can use a general or a special high pass frequency filter. For example, if the lower resolution image is an optical image, the special high pass filter can be based on a PSF that characterizes the optical device that acquired the optical image. High pass filtering, however, can accentuate high frequency noise in the optical image, especially when the optical image has a low signal to noise ratio. Optionally, the filter 118 can use other filtering techniques, such as noise reduction techniques explained in more detail by K. Watson in "Processing remote sensing images using the 2-D FFT-noise reduction and other applications", Geophysics 58 (1993) 835, ("Watson").

Referring back to FIG. 2, after pre-processing two images for alignment, the method 200 can obtain a cross correlation image (220). In one implementation, the cross correlating device 120 can calculate a cross correlation image from two images, denoted by f and g, according to Equation (1):

$$c(x,y) = \Sigma_{i,j} f(i,j) g(i-x, j-y). \quad (1)$$

In Equation (1), an ordered pair (x,y) refers to an image pixel with x coordinate x and y coordinate y; similarly, (i,j) denotes a pixel with x coordinate i and y coordinate j; $c(x,y)$ refers to a (x,y) pixel of the cross correlation image; $f(x,y)$ and $g(x,y)$ refer to a (x,y) pixel of the image f and the image g, respectively. According to Equation (1), in the cross correlation image, a pixel $c(x,y)$ characterizes an overlap of the two images for relative displacements x in the x direction, and y in the y direction. The cross correlating device 120 can calculate the cross correlation image by directly following the summation in Equation (1). Alternatively, the two images, f and g, can be Fourier transformed first to obtain two Fourier images, F and G, respectively. As explained in more detail by text books, such as "Bracewell", the cross correlation image can be obtained by inverse Fourier transformation from the product of one of the Fourier images, say F, and the complex conjugate of the other Fourier image, in this case, G*. Optionally, Fourier transformations can be performed by FFT methods.

Figure 6A:
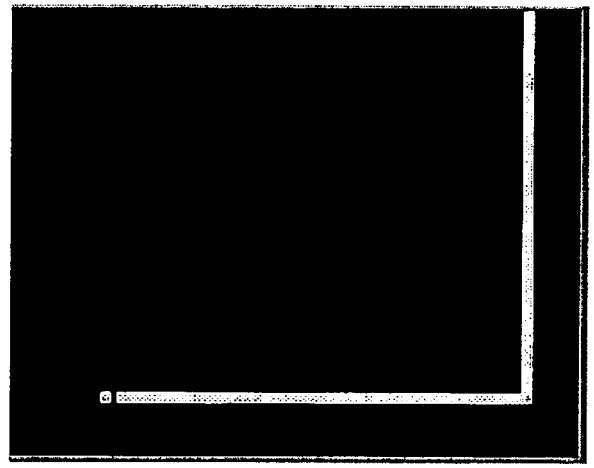
FIG. 6A shows an example CAD image.
Figure 6B:
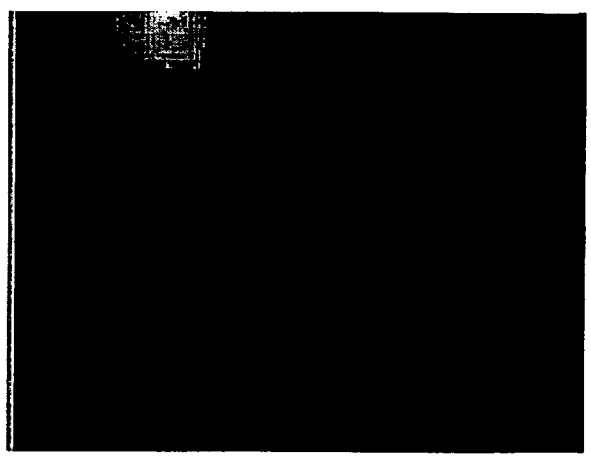
FIG. 6B shows an example optical image corresponding to the CAD image in FIG. 6A.

As illustrated in FIGS. 6–7, a cross correlation image can characterize an overlap, or correlation, of two images for alignment. For example, one of the two images can be a CAD image, as shown in FIG. 6A; the other image can be an optical image, as shown in FIG. 6B. A cross correlation image can be calculated from the two images as described above. As shown, e.g., for the x direction in FIG. 7, in a cross correlation image, pixels can characterize correlations for various displacements. In FIG. 7, using one pixel as a unit, the x coordinate describes the relative displacements of the two images; in some normalized units, the y coordinate characterizes a correlation value, or overlap. The greater the overlap between the two images, the larger the correlation value.

To reach sub-resolution accuracy, a cross correlation image can be oversampled, or interpolated (230). In one implementation, the oversampler 130 can oversample a cross correlation image of CAD and optical images. Oversampling produces an oversampled image that has extra sub-pixel points generated from the original points of the cross correlation image. As shown in FIG. 7A and 7B, the oversampler 130 can generate sub-pixel points that are, for example, 0.25 or 0.1 pixel apart. The oversampler 130 can oversample an image with spatial domain interpolation techniques, such as nearest neighbor, bilinear, or cubic spline interpolation. Most spatial domain techniques, however, can distort the high frequency content of the cross correlation image: the generated sub-pixel points can introduce new, or alter existing frequency components. For example, the original cross correlation image has no high frequency component that exceeds the inverse of the distance between pixels. Sub-pixel points, however, can artificially introduce non-zero value for such high frequency components.

To avoid artificial introduction of new high frequency components, an oversampling technique can generate sub-pixel points, for example, by a zero padding technique. In the oversampled image, zero padding sets new high frequency components to zero. For zero padding, the oversampler 130 may perform the following: Fourier transform a cross correlation image; enlarge the Fourier space of the cross correlation image by adding new high frequency components; set the new high frequency components to zero; and inverse Fourier transform the enlarged image to provide an oversampled image (see reference "Watson"). Optionally, the oversampler 130 can Fourier transform an image by using FFT. Alternatively, the oversampler 130 can use a spatial domain interpolation technique, such as Sinc interpolation (see, e.g., "Bracewell"), that does not introduce new high frequency components.

In one implementation, before the cross correlator 120 calculates a cross correlation image from two images to be aligned, the oversampler 130 can oversample one or both of the two images. For example, when the alignment system 100 aligns an optical image of an IC with a corresponding CAD image, the oversampler 130 can generate sub-pixel points for the optical image. With these sub-pixel points for the optical image, the cross correlator 120 can calculate sub-pixel points for a cross correlation image without further oversampling.

Referring back to FIG. 2, the method 200 can calculate an offset value from a cross correlation image in step 220. In one implementation, the maximum calculator 120 can find a maximum correlation value in a cross correlation image of two images. For example, FIGS. 7A–7B show graphs representing cross correlation images obtained from the images in FIG. 6A and in FIG. 6B, respectively. The location of the maximum correlation value provides an offset value that describes a displacement to align the two images. The maximum calculator 120 can find a maximum of a cross correlation image with or without oversampling. Without oversampling, as shown, for example, in FIG. 7A, the maximum location gives an integer pixel (−6 pixel, in FIG. 7A) as an offset value. With oversampling, however, the highest maximum can be located with sub-pixel precision (−5.6 pixel, in FIG. 7A), as described by the sub-pixel points obtained from oversampling the cross correlation image.

In a cross correlation image, a maximum provides an offset value as the location of the maximum. At the same time, the correlation value at the maximum can be interpreted as a confidence factor characterizing confidence in the offset value. In one implementation, cross correlation images are calculated for different sub-regions of the two images to be aligned. For each sub-region, an offset value and a confidence factor is obtained. The confidence factor can be used for selecting the sub-region that is used for alignment: the higher the confidence factor, the more likely that the corresponding offset value is close to the correct one. Optionally, the confidence factor can be given to a human operator for selecting a sub-region for alignment.

Figure 6C:
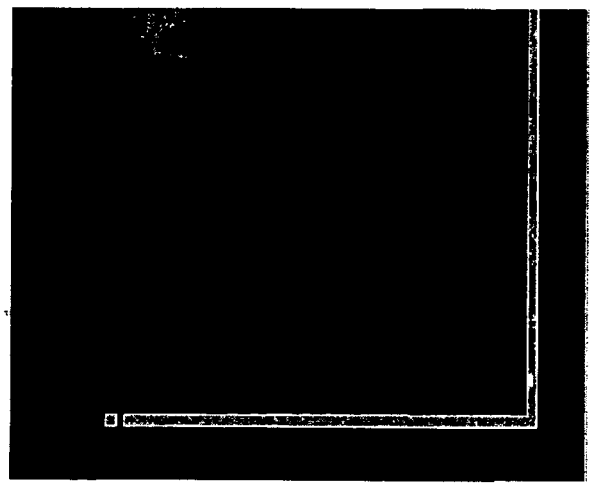
FIG. 6C shows an alignment of the images in FIGS. 6A and 6B.

As shown in FIG. 6C for aligning the CAD image in FIG. 6A and the optical image in FIG. 6B, even with oversampling, substantial misalignment may occur. The misalignment may be due to an optical ghost in the optical image. When a ghosted optical image is used to calculate a cross correlation image, the optical ghost may cause more than one maximum in the cross correlation image (see, e.g., FIG. 7A). The height of these maximums can depend on a point spread function that is used during image pre-processing in resolution adjustment 318. For example, as shown in FIGS. 7A and 7B, the highest maximum obtained can differ depending on whether resolution is adjusted with or without a PSF. When resolution is not adjusted with a PSF, the cross correlation image may show a highest maximum located at the ghost position, shown around −5.6 pixels in FIG. 7A. When resolution is adjusted with a PSF, the relative height might change to make the true maximum, shown in FIG. 7B around −0.8 pixels, higher than the maximum for the ghost. Appropriate alignment is typically obtained with a PSF characterizing the optical system that produced the ghosted optical image.

With the help of an offset value, two images can be aligned (FIG. 2; 250). In one implementation, after aligning the two images, the cross correlator 120 can provide a second cross correlation image. Then, the alignment system 100 can apply the steps 230–250 of the method 200 a second time. The second alignment can provide a better alignment than the first alignment. Potentially, further iterations may produce better results.

Furthermore, more than two images can be aligned as well. For example, three images can be aligned by selecting pairs of images for alignment. A first pair of images may include the first and second image. After aligning the images of the first pair, the third image can be aligned with one of the first pair; optionally, the third image can also be aligned with the other image of the first pair. Alternatively, a combined image can be generated from the aligned first pair, and the third image can be aligned with the combined image.

TABLE 1

| ROI | Ex pix | Ey pix | Ex nm | Ey nm | E nm | CC | H |
|---|---|---|---|---|---|---|---|
| 1 | 0.4 | 0.1 | 76 | 19 | 78 | 0.62 | 0.86 |
| 2 | 0.4 | 0.1 | 76 | 19 | 78 | 0.62 | 0.86 |
| 3 | 0.2 | 0.2 | 38 | 38 | 54 | 0.56 | 0.68 |
| 4 | 0.3 | 0.1 | 57 | 19 | 60 | 0.57 | 0.63 |
| 5 | 0.1 | 0.1 | 19 | 19 | 26 | 0.69 | 0.83 |
| 6 | 0.1 | 0.4 | 19 | 76 | 78 | 0.69 | 0.83 |
| 7 | 0.1 | 0.4 | 19 | 76 | 78 | 0.69 | 0.84 |
| 8 | 0.1 | 0.4 | 19 | 76 | 78 | 0.69 | 0.84 |
| 9 | 0.1 | 0.4 | 19 | 76 | 78 | 0.69 | 0.84 |
| 10 | 0.1 | 0.3 | 19 | 57 | 60 | 0.69 | 0.85 |
| 11 | 0.1 | 0.2 | 19 | 38 | 42 | 0.69 | 0.85 |
| 12 | 0.1 | 0.2 | 19 | 38 | 42 | 0.69 | 0.85 |
| 13 | 0.0 | 0.2 | 0 | 38 | 38 | 0.69 | 0.86 |
| 14 | 0.0 | 0.3 | 0 | 57 | 57 | 0.70 | 0.86 |
| 15 | 0.0 | 0.2 | 0 | 38 | 38 | 0.70 | 0.87 |
| 16 | 0.0 | 0.3 | 0 | 57 | 57 | 0.70 | 0.87 |
| 17 | 0.1 | 0.3 | 19 | 57 | 60 | 0.65 | 0.84 |
| 18 | 0.2 | 0.3 | 38 | 57 | 68 | 0.66 | 0.84 |
| 19 | 0.5 | 0.1 | 95 | 19 | 96 | 0.71 | 0.92 |
| 20 | 0.5 | 0.0 | 95 | 0 | 95 | 0.71 | 0.94 |

$\mu = 63$ nm
$\sigma = 19$ nm

As shown in Table 1, in one implementation, an IR image of a test IC can be aligned with a corresponding CAD image with sub-resolution accuracy. The IR image is measured from the silicon side through the substrate. In a flip-chip packaging, the test IC has test features with linear dimensions below one micron. The IR image, however, shows the test feature with a resolution of about one micron. To estimate statistical properties of alignment with the CAD image, the IR image is divided into twenty different regions of interest (ROI), each ROI having 256×256 pixel; each pixel corresponding to 0.189 micron. Each ROI is independently aligned with a corresponding region of the CAD image using a preferred implementation of the method 200 (FIG. 2). In the preferred implementation, the CAD image is resolution adjusted with a point spread function (FIG. 5). Furthermore, after a first alignment, a second alignment repeats the steps 230–250 of the method 200 to improve alignment accuracy between the IR and CAD images.

Next, to calculate the accuracy of the alignment, the sample features are exposed, and the sample IC is imaged with a FIB to provide a high resolution image. The high resolution FIB image is aligned both with the CAD image and the IR image to estimate errors in the alignment of the IR and CAD images. As shown in Table 1, the estimated errors are Ex in the x direction and Ey in the y direction; E is the total (square root) error. For the alignment of the CAD and IR images, the average alignment error is $\mu$=63 nm with a standard deviation $\sigma$=19 nm. Consequently, since the average alignment error is less than 0.1 micron, i.e., 1/10 of the resolution of the IR image, the IR and CAD images are aligned with sub-resolution accuracy.

Furthermore, as shown in Table 1, confidence factors (CC) are normalized as 1.0 for perfect alignment, and the information content value (H) corresponds to Shannon's entropy as described, e.g., in "Bracewell".

Various implementations, sub-resolution alignment methods and apparatuses have been described for images used in IC probing and editing systems. Nevertheless, it will be understood that the application can be implemented for sub-resolution alignment of images for other systems as well: for example, lithographic systems, scanning electron microscopy, or laser scanning microscopy.

The computational aspects described here can be implemented in digital electronic circuitry, or in computer hardware, firmware, software, or in combinations of them. Where appropriate, aspects of these systems and techniques can be implemented in a computer program product tangibly embodied in a machine-readable storage device for execution by a programmable processor; and method steps can be performed by a programmable processor executing a program of instructions to perform functions by operating on input data and generating output.

To provide for interaction with a user, a computer system can be used having a display device such as a monitor or LCD screen for displaying information to the user and a keyboard and a pointing device such as a mouse or a trackball by which the user can provide input to the computer system. The computer system can be programmed to provide a graphical user interface through which computer programs interact with users.

Other embodiments are within the scope of the following claims.

What is claimed is:

1. A method for aligning images, the method comprising:
   receiving a plurality of images including a first image and a second image that has a higher resolution than the first image;
   generating cross correlation image that corresponds to relative displacements of the first and second images by calculating correlation values using a transform to a frequency domain, the correlation values characterizing relative displacements and corresponding overlaps of the first and second images;
   oversampling the cross correlation image from the frequency domain to generate an oversampled cross correlation image that includes extra sub-pixel points;
   based on the oversampled cross correlation image, determining an offset value that corresponds to a misalignment of the first and second images by determining a location of a maximum correlation value between the first and second images; and
   using the maximum correlation value as a confidence factor characterizing confidence in the determined offset value.

2. The method of claim 1, further comprising:
   aligning the first and second images based on the determined offset value.

3. The method of claim 2, wherein aligning comprises:
   achieving alignment of the first and second images to a precision greater than the resolution of the first image.

4. The method of claim 2, further comprising:
   after aligning the first and second images, performing another iteration of generating an oversampled cross correlation image and determining an offset value for the first and second images.

5. The method of claim 1, wherein oversampling the cross correlation image comprises:
   in the oversampled cross correlation image, excluding frequencies missing from the cross correlation image.

6. The method of claim 5, wherein excluding frequencies comprises:
   using a zero padding technique to set high frequency components to zero.

7. The method of claim 1, wherein the first and second images represent a common object.

8. The method of claim 7, wherein the common object comprises a physical layout of an integrated circuit.

9. The method of claim 8, further comprising:
   based on the determined offset value, navigating an apparatus to a specified point on the integrated circuit with a precision greater than the resolution of the first image.

10. The method of claim 9, further comprising:
probing the integrated circuit at the specified point.

11. The method of claim 10, wherein probing the integrated circuit comprises:
probing the integrated circuit with laser voltage probing or electron-beam probing.

12. The method of claim 9, further comprising:
editing the integrated circuit at the specified point.

13. The method of claim 12, wherein editing the integrated circuit comprises:
editing the integrated circuit with focused ion beam.

14. The method of claim 7, wherein the common object represents a voltage contrast of an integrated circuit.

15. The method of claim 1, wherein at least one of the first and second images comprises an acquired image.

16. The method of claim 15, wherein the acquired image is an acquired image of an integrated circuit.

17. The method of claim 16, wherein the acquired image of the integrated circuit is acquired from the silicon side of the integrated circuit.

18. The method of claim 16, wherein the acquired image of the integrated circuit is acquired from the front side of the integrated circuit.

19. The method of claim 15, wherein the acquired image is an optically acquired image.

20. The method of claim 19, wherein the optically acquired image is an infrared image.

21. The method of claim 15, wherein the acquired image is a voltage contrast image.

22. The method of claim 15, wherein the acquired image is a scanning electron microscope image.

23. The method of claim 15, wherein the acquired image is a focused ion beam image.

24. The method of claim 15, wherein the acquired image is acquired by an electron beam prober.

25. The method of claim 1, wherein the second image comprises an ideal reference image.

26. The method of claim 25, wherein the ideal reference image is an image of an integrated circuit generated by a computer-aided design system.

27. The method of claim 1, wherein calculating correlation values using the transform to the frequency domain comprises:
calculating the correlation values using Fast Fourier Transform techniques.

28. The method of claim 1, further comprising:
prior to generating the oversampled cross correlation image, pre-processing one or each of the first and second images to reduce mismatch between the first and the second image.

29. The method of claim 28, wherein pre-processing comprises one or more of adjusting rotation, adjusting magnification, adjusting intensity, and filtering.

30. The method of claim 29, wherein adjusting rotation comprises:
calculating angular mismatch between the first and the second image.

31. The method of claim 29, wherein adjusting magnification comprises:
adjusting magnification using a 3-point alignment technique.

32. The method of claim 29, wherein adjusting intensity comprises:
normalizing intensities of the first and second images by a histogram equalization technique.

33. The method of claim 29, wherein adjusting intensity comprises:
matching gray-scale levels in corresponding regions of the first and second images.

34. The method of claim 29, wherein filtering comprises:
applying a low pass filter to the second image.

35. The method of claim 29, wherein filtering comprises:
filtering with a point spread function.

36. The method of claim 35, wherein the point spread function simulates optical ghosting in one of the first and second images.

37. The method of claim 1, further comprising:
generating a second oversampled cross correlation image that corresponds to relative displacements of the second image and a third image; and
aligning the third image with the first and second images based on the second oversampled cross correlation image.

38. A method of inspecting an integrated circuit device, the method comprising:
obtaining a computer-generated representation of a physical layout of an integrated circuit design;
acquiring an image of an integrated circuit device corresponding to the integrated circuit design, the acquired image having a resolution lower than a resolution of the computer-generated representation;
generating an oversampled cross correlation image that corresponds to displacements of the computer-generated representation and the acquired image, wherein generating the oversampled cross correlation image comprises generating sub-pixel points for the oversampled cross correlation image, and in the oversampled cross correlation image, using a zero padding technique to set high frequency components to zero;
based on the oversampled cross correlation image, determining an offset value that corresponds to a misalignment of the computer-generated representation and the acquired image;
aligning, with a precision exceeding the resolution of the acquired image, the computer-generated representation and the acquired image based on the determined offset value; and
probing the integrated circuit device based on a result of the alignment.

39. The method of claim 38, further comprising:
editing the integrated circuit device based on the alignment result.

40. The method of claim 38, wherein the acquired image is an infrared image of the integrated circuit.

41. The method of claim 38, wherein the acquired image is a voltage contrast image.

42. The method of claim 38, wherein generating the oversampled cross correlation image comprises:
calculating correlation values that characterize relative displacements and corresponding overlaps of the computer-generated representation and the acquired image.

43. The method of claim 38, wherein determining the offset value comprises:
determining a location of a maximum correlation value between the computer-generated representation and the acquired image.

44. The method of claim 38, further comprising:
prior to generating the oversampled cross correlation image, pre-processing the computer-generated representation and the acquired image, wherein pre-processing comprises one or more of adjusting rotation, adjusting magnification, adjusting intensity, and filtering.

45. The method of claim 44, wherein filtering comprises:
applying a low pass filter to the computer-generated representation, the low pass filter being based on a point spread function.

46. A method of facilitating alignment of a plurality of images including a first image and a second image having a higher resolution than the first image, the method comprising:
pre-processing the second image to optimize one or more properties of the second image; said pre-processing comprising applying a low pass filter based on a point spread function, wherein said point spread function simulates optical ghosting;
generating an oversampled cross correlation image that corresponds to displacements of the first and second images; and
based on the oversampled cross correlation image, determining an offset value that corresponds to a misalignment of the first and second images.

47. The method of claim 46, wherein pre-processing the second image further comprises performing one or more of the following operations on the second image: adjusting rotation, adjusting magnification, and adjusting intensity.

48. The method of claim 46, wherein the first and second images represent a common object.

49. The method of claim 48, wherein the common object comprises a physical layout of an integrated circuit.

50. The method of claim 46, wherein at least one of the first and second images comprises an acquired image.

51. The method of claim 50, wherein the acquired image is an infrared image of an integrated circuit.

52. The method of claim 46, wherein generating the oversampled cross correlation image comprises:
calculating correlation values that characterize relative displacements and corresponding overlaps of the first and second images.

53. The method of claim 46, wherein generating the oversampled cross correlation image comprises:
generating sub-pixel points for the oversampled cross correlation image; and
in the oversampled cross correlation image, using a zero padding technique to set high frequency components to zero.

54. The method of claim 46, wherein determining the offset value comprises:
determining a location of a maximum correlation value between the first and second images.

55. An article comprising a computer-readable medium including instructions for causing a computer system to perform operations comprising:
pre-processing images to optimize one or more properties of the images, the images including a first image and a second image having a resolution greater than the first image, and said pre-processing comprising applying a low pass filter based on a point spread function to one of the images, wherein said point spread function simulates optical ghosting;
generating an oversampled cross correlation image that corresponds to displacements of the first and second images; and
based on the oversampled cross correlation image, determining an offset value that corresponds to a misalignment of the first and second images.

56. The article of claim 55, wherein pre-processing the images further comprises performing one or more of the following operations on one of the images: adjusting rotation, adjusting magnification, and adjusting intensity.

57. The article of claim 55, wherein the first and second images represent a common object.

58. The article of claim 57, wherein the common object comprises a physical layout of an integrated circuit.

59. The article of claim 55, wherein at least one of the first and second images comprises an acquired image.

60. The article of claim 59, wherein the acquired image is an infrared image of an integrated circuit.

61. The article of claim 55, wherein instructions for causing a computer system to generate the oversampled cross correlation image comprise instructions for causing the computer system to:
calculate correlation values that characterize relative displacements and corresponding overlaps of the first and second images.

62. The article of claim 55, wherein instructions for causing a computer system to generate the oversampled cross correlation image comprise instructions for causing the computer system to:
generate sub-pixel points for the oversampled cross correlation image; and
in the oversampled cross correlation image, use a zero padding technique to set high frequency components to zero.

63. The article of claim 55, wherein instructions for causing a computer system to determine the offset value comprise instructions for causing the computer system to:
determine a location of a maximum correlation value between the first and second images.

* * * * *